Dec. 7, 1937.    H. R. ELLINWOOD    2,101,469
FILM MOVING MECHANISM
Filed Feb. 11, 1935    4 Sheets-Sheet 1

Inventor
*Herman R. Ellinwood*
By
Attorney

Dec. 7, 1937. H. R. ELLINWOOD 2,101,469
FILM MOVING MECHANISM
Filed Feb. 11, 1935 4 Sheets-Sheet 3

Inventor
Herman R. Ellinwood
By R. S. Berry
Att'y.

Dec. 7, 1937.   H. R. ELLINWOOD   2,101,469
FILM MOVING MECHANISM
Filed Feb. 11, 1935   4 Sheets-Sheet 4
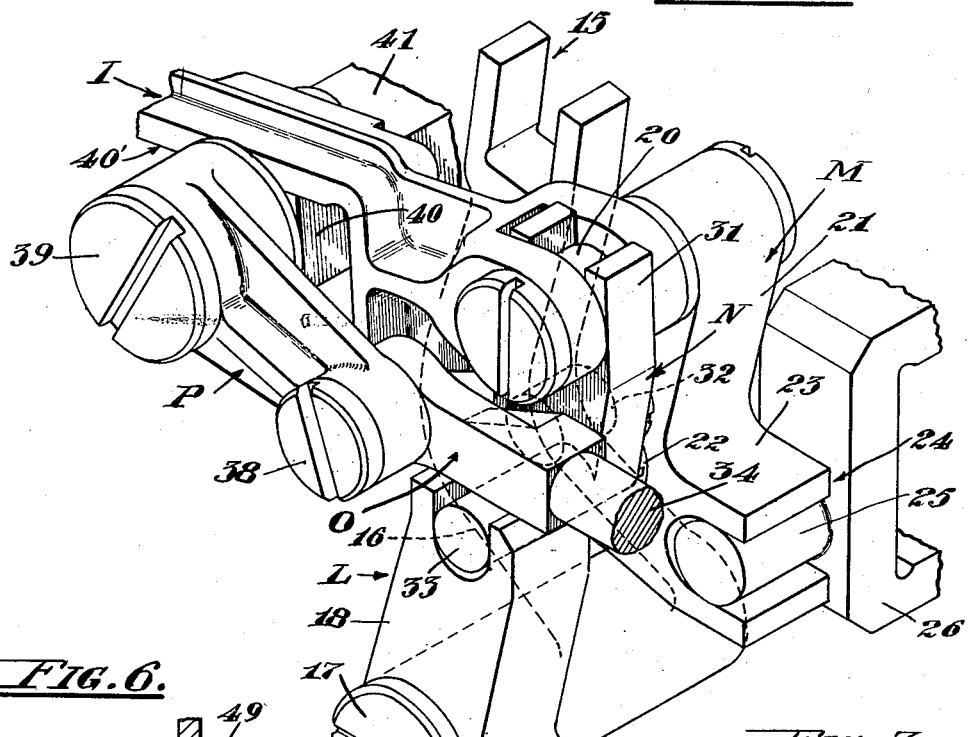
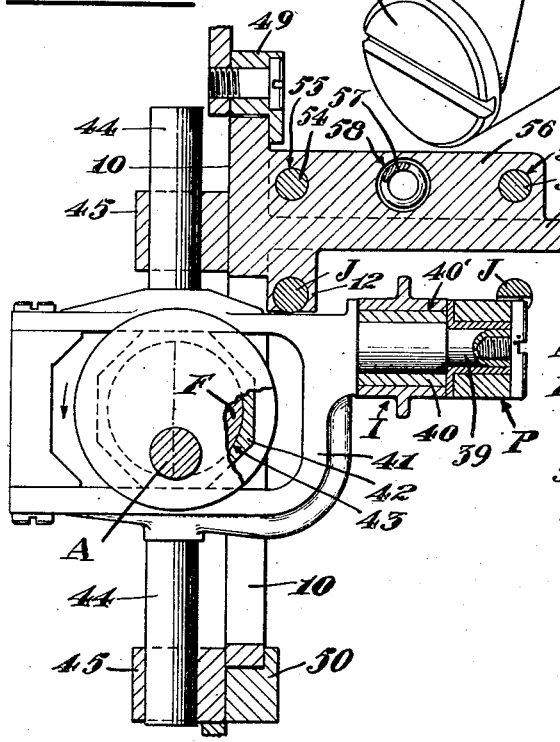
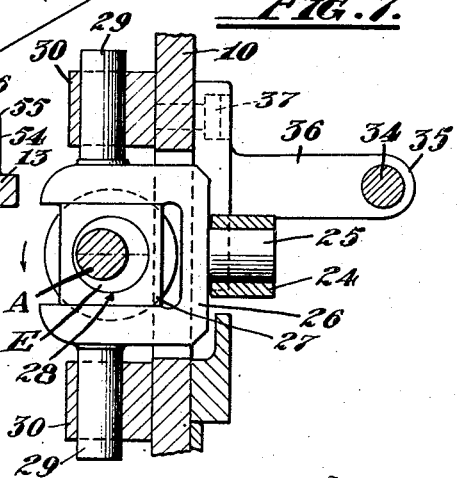
Inventor
Herman R. Ellinwood
By
Attorney Patented Dec. 7, 1937

2,101,469

UNITED STATES PATENT OFFICE 2,101,469

FILM MOVING MECHANISM

Herman Ray Ellinwood, Los Angeles, Calif.

Application February 11, 1935, Serial No. 5,923

13 Claims. (Cl. 88—18.4)

This invention relates generally to intermittent movement mechanism, and more particularly pertains to mechanism for effecting intermittent movement of films in motion picture cameras, projectors, and the like.

The present invention has to do with that type of movement embodying an oscillating claw arm operable to intermittently engage and pull down films and associated with mechanism for holding the film in proper registration with an exposure aperture during the period in which the film is not being advanced by action of the claw arm.

The paramount aim of the present invention is to provide a film movement of the type referred to, which is characterized by extreme quietness of operation.

Another object is to provide a film movement which is capable of effecting an unusually rapid pull down or advance of the film with a long dwell or exposure period during which the film is maintained stationary.

It has heretofore been common practice in devices of the above character to employ a transverse drive embodying intermeshed gears resulting in an undesirable noise or hum, and it is the purpose of the present invention to eliminate such gears and thereby obviate such noise or hum.

A further object of the present invention is to provide simple and rugged means of operative interconnection between the claw arm operating mechanism and a registering means for holding the films stationary during retrograde movement of the claw arm.

Another object is to provide a film movement of the above character in which both the claw arm operating mechanism and registering means are actuated from a revolving shaft through the medium of a system of levers and links controlled by eccentrics.

In addition to providing for complete registration of the film for an unusually long period of time, it is a further object to obtain such registration without appreciable motion of the register pins during this time and to effect withdrawal of the pins in an unusually small portion of the registration period, thereby minimizing the usual sawing action during registrating and eliminating the usual unsteadiness of the film due to either the motion of register pins during registration or during withdrawal of said pins.

Of considerable importance in the operation of equipment with which intermittent movement mechanisms of the type above referred to are employed, is the facility of threading film into the movement, and accordingly it is a further object of this invention to provide simple and unusually expeditious means for facilitating threading film into the movement mechanism.

A common fault of the ordinary movements of the type referred to is that irregularities in the driving gear teeth cause slight fluctuations in the speed of the interconnected units, such as sound recording sprockets or other devices, which produces considerable distortion of the sound recorded, and accordingly an additional object of the present invention is to eliminate this usual gear drive and the resultant distortion due to inaccuracies in gear teeth.

It is highly desirable that the film engaging claw describe a circular arc of large radius in pulling down the film, and it is also desirable that this arc continue to very nearly the extreme end position of its path of travel, and a purpose of this invention is to accomplish such desirable features to an unusual degree, and to effect pull-down of the film in a film channel having relatively large radius of curvatures without a sawing action between the film perforations and the claw arm except at extreme positions where in and out of engagement motions start.

Various additional objects and features of the invention will appear and will be more fully understood from the following detailed description of a present preferred embodiment thereof, reference for this purpose being had to the accompanying drawings in which:

Fig. 5 is a perspective view of the operating mechanism with parts removed;

Fig. 6 is a detail in section and elevation taken on the line 6—6 of Fig. 3 as seen in the direction indicated by the arrows and showing cam mechanism for effecting a right angle drive to the film pull-down claws;

Fig. 7 is a detail in section and elevation taken on the line 7—7 of Fig. 3, as seen in the direction indicated by the arrows showing a second right angled cam drive for controlling operation of registering pins;

Fig. 8 (Sheet 1) is a view in horizontal section taken on the line 8—8 of Fig. 3:

Figure 1:
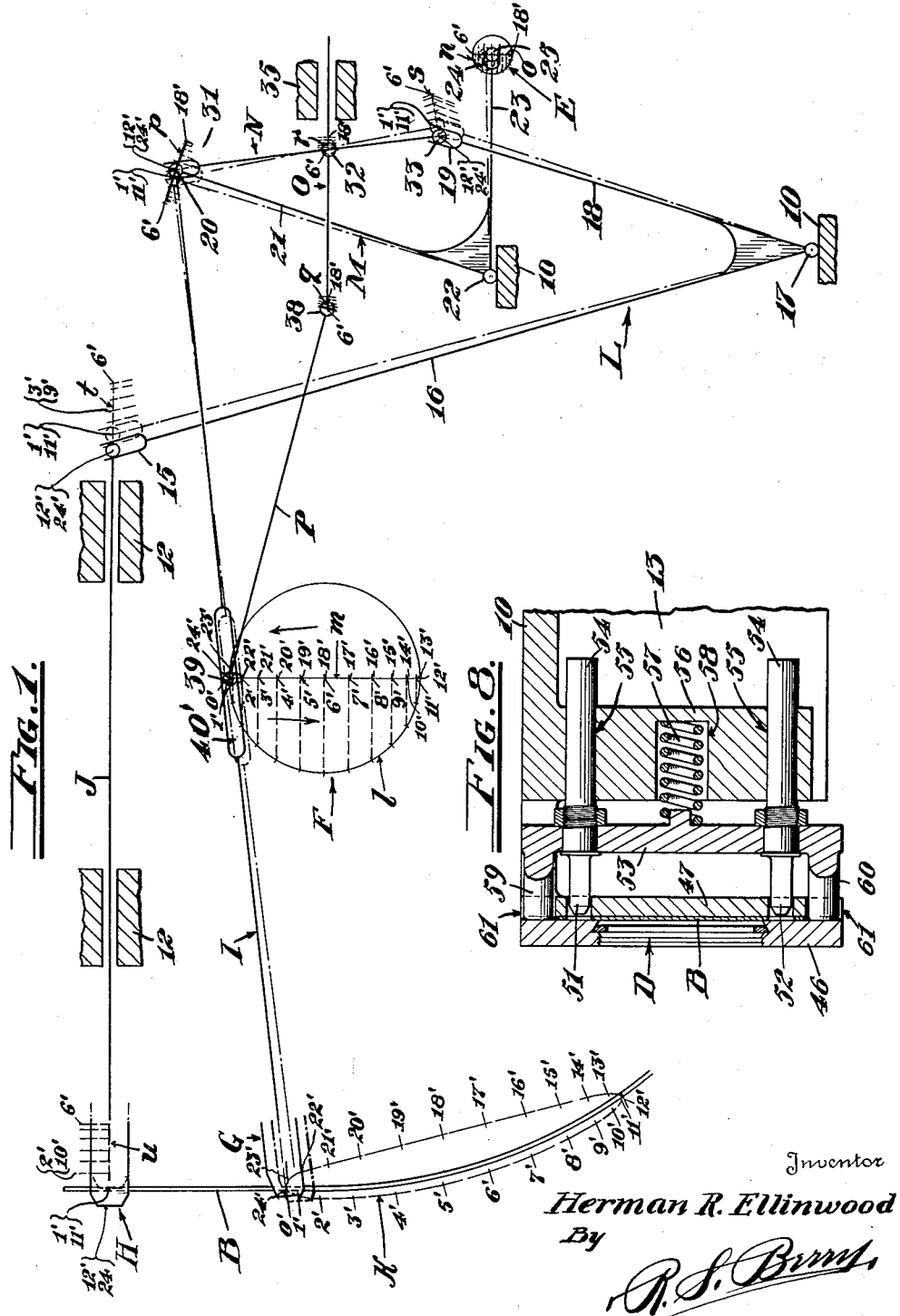
Fig. 1 is a schematic diagram of the mechanism showing the parts as arranged with the claw disposed as initially advanced into engagement with the film and in readiness to effect pull-down of the latter, and showing the film registering means in engagement with the film and as about to be disengaged therefrom.

Referring to the drawings more specifically in which corresponding reference characters designate corresponding parts throughout the several views, A indicates a drive shaft which may be driven from any suitable source of power and when in action is rotated continuously and which shaft is utilized as a source of motion to effect intermittent movement of the usual perforated film B used in motion picture cameras, projectors and the like. The shaft A may be employed in a motion picture camera or projector to effect driving of a shutter mechanism not necessary to be here shown or may be independent thereof. The film B is carried in a guideway C formed with the usual exposure aperature D, which guideway is vertically disposed except at the lower portion thereof where it is curved rearwardly to conform to the curvature of motion of the film moving means presently to be described. The film is moved intermittently in the guideway by the film moving mechanism, hereinafter described, and during the periods of dwell, or alternately with the periods of movement or pull-down, the film is engaged by film holding mechanism which registers the successive film frames with the exposure aperture D in a well known manner.

The shaft A is arranged with its axis extending on a plane perpendicular to the path of travel of the film past the exposure aperture D, and on a plane below the latter; it being off-set relative to the guideway C and extending across one edge of the latter contiguous thereto where employed to operate shutter mechanism arranged forward of the guideway in a usual manner. The shaft A is journalled in bearings $a$ protruding from the back of a vertical panel 10 extended rearwardly relative to the guideway C.

In carrying out the present invention the shaft A is equipped with a pair of circular eccentrics E and F the major axes of which extend at right angles relative to each other as particularly shown in Figs. 6 and 7. The eccentrics are provided to serve as actuators for film pull-down claws G and register pins H for holding the film against movement during disengagement of the claws G therefrom; the eccentric E being operatively connected to mechanism for effecting longitudinal movement of the register pins and claws, and the eccentric F being operatively connected to mechanism for oscillating the claws.

The claws G, two in number, are formed on the outer end of an arm I; being in the form of pins which protrude in parallel relation to each other from the outer face of a cross head $b$ formed on the outer end of the arm I, and being arranged with their axes extending on a common plane and adapted to be engaged with and disengaged from a pair of opposed marginal perforations in the film B in a manner common in film advancing mechanisms of this character.

The register pins H are carried on the outer ends of a pair of parallel slide bars J which extend perpendicular to the path of travel of the film B where the latter passes the exposure aperture D, and which bars are connected together adjacent their rearward ends by a cross bar 11, whereby the bars J may be reciprocated in unison.

The register pins H extend with their axes in parallel relation with each other and are spaced apart so as to effect engagement and disengagement with a pair of opposed film perforations at the point adjacent the lower margin of the exposure aperture D.

The slide bars J are reciprocally mounted in guide blocks 12 suitably fixed and carried relatively to the vertically extending back panel 10; the outermost pairs of the guide blocks 12 depending from a bracket 13 affixed to the panel and protruding forwardly therefrom.

Slidably connecting with the cross bar 11 is a yoke 15 formed on the upper end of a long arm 16 of a bell crank lever L fulcrumed on a pivot pin 17 and which bell crank includes an upstanding short arm 18 terminating in a yoke 19. The pivot pin 17 is carried by and protrudes horizontally from the panel 10 and affords an axis on which the bell crank lever L may swing on a vertical plane parallel with the panel 10 in a fashion to effect longitudinal reciprocal movement of the slide bars J to move the register pins H in and out of engagement with film B as will hereinafter be fully described.

The claw carrying arm I is pivotally carried on a pivot pin 20 affixed to the upper end of the long arm 21 of a bell crank lever M fulcrumed to swing on a vertical plane parallel with the bell crank lever L on a pivot pin 22 carried by the panel 10; the short arm 23 of which bell crank lever is formed with a yoke 24 which extends astride a pin 25 projecting horizontally from the end wall of a horizontally extending follower yoke 26 operatively connected to the eccentric E.

The follower yoke 26 is fitted with a slide block 27 which encompasses the eccentric E and is provided with a circular opening 28, which slidably conforms to the periphery of the eccentric.

The follower yoke 26 has its upper and lower members fitted with axially aligned guide pins 29 which are slidably supported for vertical movement in guide bearings 30 protruding from the back of the panel 10. The follower yoke 26 is thus adapted to be reciprocated vertically by the eccentric E on rotation of the shaft A and thereby impart rocking movement to the bell crank lever M so as to effect longitudinal reciprocation of the claw carrying arm I through the pin 20 on the upstanding arm 21 of the bell crank lever M.

Slidably engaging the pin 20 is a yoke 31 on the upper end of a straight lever N fulcrumed intermediate its ends on a pivot pin 32 carried on a horizontally reciprocal slide bar O, and the lower end of which lever N carries a horizontally extending pin 33 which is engaged by the yoke 19 on the upper end of the short arm 18 of the bell crank lever L.

The slide bar O is formed with a cylindrical end portion 34 which slidably extends into a tubular guide bearing 35 carried on a bracket 36 affixed to the panel 10 by screws 37; the bar O being designed to have slight longitudinal movement on a horizontal plane.

Carried by the outer end of the slide bar O is a pivot pin 38 to which is connected one end of a link P, the opposite end of which connects with a pivot pin 39 projecting through a slide block 40 carried in a longitudinally extending slot 40' in the claw carrying arm I, and in which slot the slide block 40 is shiftable longitudinally of the arm I.

The pin 39 is affixed to a follower yoke 41 which is operatively connected to the eccentric F by a slide block 42 carried by the yoke having a circular opening 43, the wall of which slidably conforms to the periphery of the eccentric. The slide block 42 is adapted to move horizontally between the upper and lower members of the follower yoke 41, which latter is mounted for vertical movement and for which purpose is fitted with vertically extending axially aligned guide pins 44 which extend through and are slidably supported in guide bearings 45 protruding from the back of the panel 10.

The eccentric F is thus adapted to operate through the follower yoke 41, pin 39, and slide block 40, to effect vertical rocking movement of the claw carrying arm I and which arm is, as before stated, also adapted to have longitudinal movement imparted thereto by the eccentric E.

The film guide C embodies a front wall portion 46 which is rigidly affixed in any suitable manner to the housing of a motion picture camera or projector interiorly thereof. The guideway also includes a back member 47 comprising a plate carried by the panel 10 and projecting forwardly therefrom at right angles thereto, and which plate is formed to abut against the forward wall 46 of the guide and is formed on its outer face with a vertical channel 48 formed to slidably receive the film B and form a guideway for the latter.

The panel 10 is supported at its upper and lower margins in horizontally extending guide rails 49 and 50 whereby the panel is adapted to be shifted longitudinally toward and away from the fixed forward portion 46 of the film guideway, and whereby the plate 47 may be spaced from the wall 46 to facilitate positioning of the film in the guideway and its initial engagement with the register pins.

This slidable mounting of the panel 10 not only affords a means for enabling spacing of the plates 46 and 47 to facilitate positioning of the film B in the guide channel 48 but also facilitates threading of the film for initial engagement therewith of the claws G and pins H. In order to enable rapid initial positioning of the film in the guideway a pair of parallel pins 51 and 52 are mounted on a cross head 53 and are disposed on a plane above the register pins H in a position to engage opposed perforations in the film in vertically spaced relation to the perforations engaged by the register pins H. The cross head 53 is carried on a pair of horizontally extending guide pins 54 which project through guide openings 55 in an upstanding flange 56 on the bracket 13; the pins 54 being slidable longitudinally through the bracket and being normally maintained in an advanced position under the urge of a spring 57 seating in a socket 58 in the flange 56 and bearing against the rear face of the cross head 53. Mounted on the end portions of the cross head 53 and extending in parallel relation to the pins 51 and 52 are abutment pins 59 and 60 which are arranged to abut against the rear face of the apertured plate 46 at points adjacent to but spaced from the opposite edges of the film B; the plate 47 being formed with openings 61 into which the outer ends of the abutment pins 59 and 60 extend.

The ends of the abutment pins 59 and 60 protrude a short distance beyond the outer ends of the film engaging pins 51 and 52 so that when the panel 10 is in its fully advanced position with the plate 47 abutting against the plate 46 the ends of the abutment pins 59 and 60 will abut against the rear face of the plate 46 thereby retracting the cross head 53 in opposition to the spring 57 and thus dispose the tips of the pins 51 and 52 out of engagement with the film B.

Figure 3:
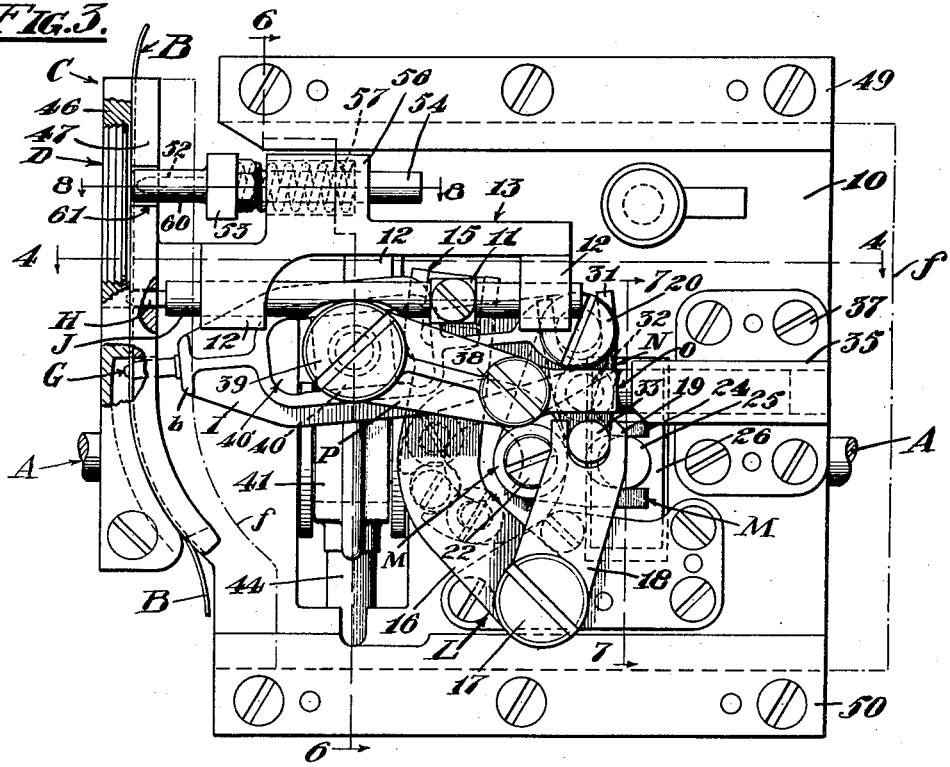
Fig. 3 is a view in side elevation of the mechanism with the parts as disposed in the position shown in Fig. 1, and depicting in dotted lines the manner of shifting the assembly to facilitate initial threading of the film.
Figure 4:
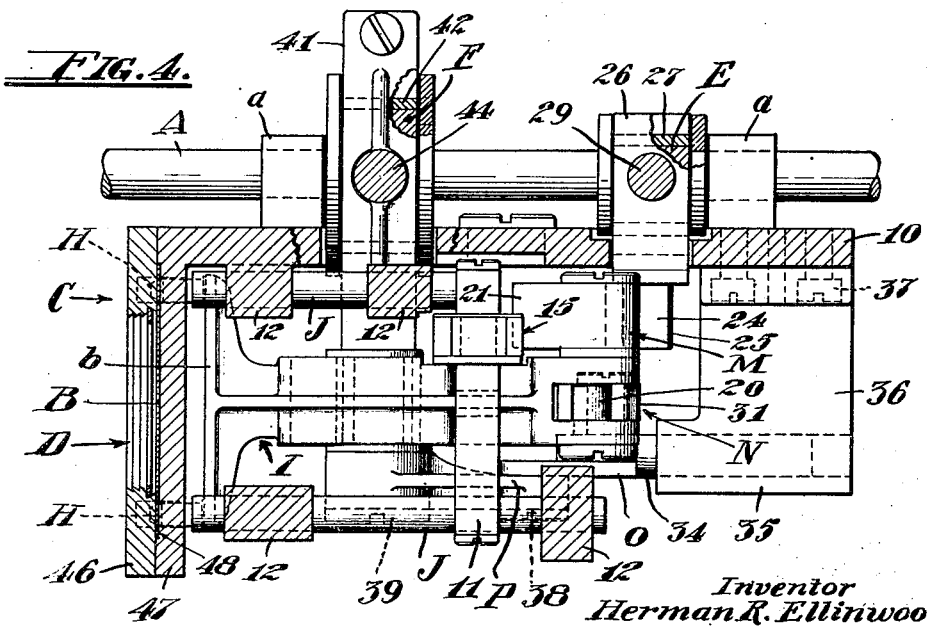
Fig. 4 is a horizontal section and plan view of the mechanism as seen on the line 4—4 of Fig. 3.

In initially positioning the film in the guideway the plate 10 is retracted as indicated by the dotted line *f* in Fig. 3 thus spacing the plate 47 from the apertured plate 46 and allowing the cross head 53 to be advanced under the urge of the spring 57. A length of a loop of film is then inserted edgewise into position in the guideway 48 and is engaged by the ends of the pins 51 and 52 with a length of the loop portion of the film protruding downwardly in front of the ends of the pins H and claws G. The panel 10 is then restored to its normal position shown in Fig. 3 thus retracting the cross head 53 and withdrawing the pins 51 and 52 out of engagement with the film B which will then be disposed with opposed perforations thereof either engaged by the register pins H or by the claws G; the pins 52 being spaced from the register pins H such distance that when opposed perforations in the film are engaged by the pins 52 opposed perforations will be positioned for engagement by the register pins H.

If at the time of disposing the film in the guideway the register pins are retracted, the actuating mechanism should be manually adjusted to dispose either the pins H or the claws G in their registering position.

The film actuating mechanism, including the shaft A, being carried on the panel 10 is therefore moveable therewith as a unit, so that in effecting initial disposing of the film in the guideway in position for engagement by the pull-down claws no disarrangement of the parts of the actuating mechanism is occasioned.

In operation rotation of the shaft A revolves the eccentrics E and F in unison, thereby effecting vertical reciprocal movement of the followers 26 and 41, respectively; the eccentric E being formed of a diameter less than that of the eccentric F and being of such slight eccentricity as to impart comparatively short movement or stroke to the follower 26 relative to that of the follower 41. The major axes of the eccentrics E and F being perpendicular to each other, the follower 26 will be disposed in its intermediate position when the follower 41 is disposed at either end of its stroke. Vertical movements of the followers 26 and 41 act to reciprocate the claw carrying arm I and slide bars J carrying the register pins H longitudinally and to oscillate the arm I vertically as before stated.

Figure 2:
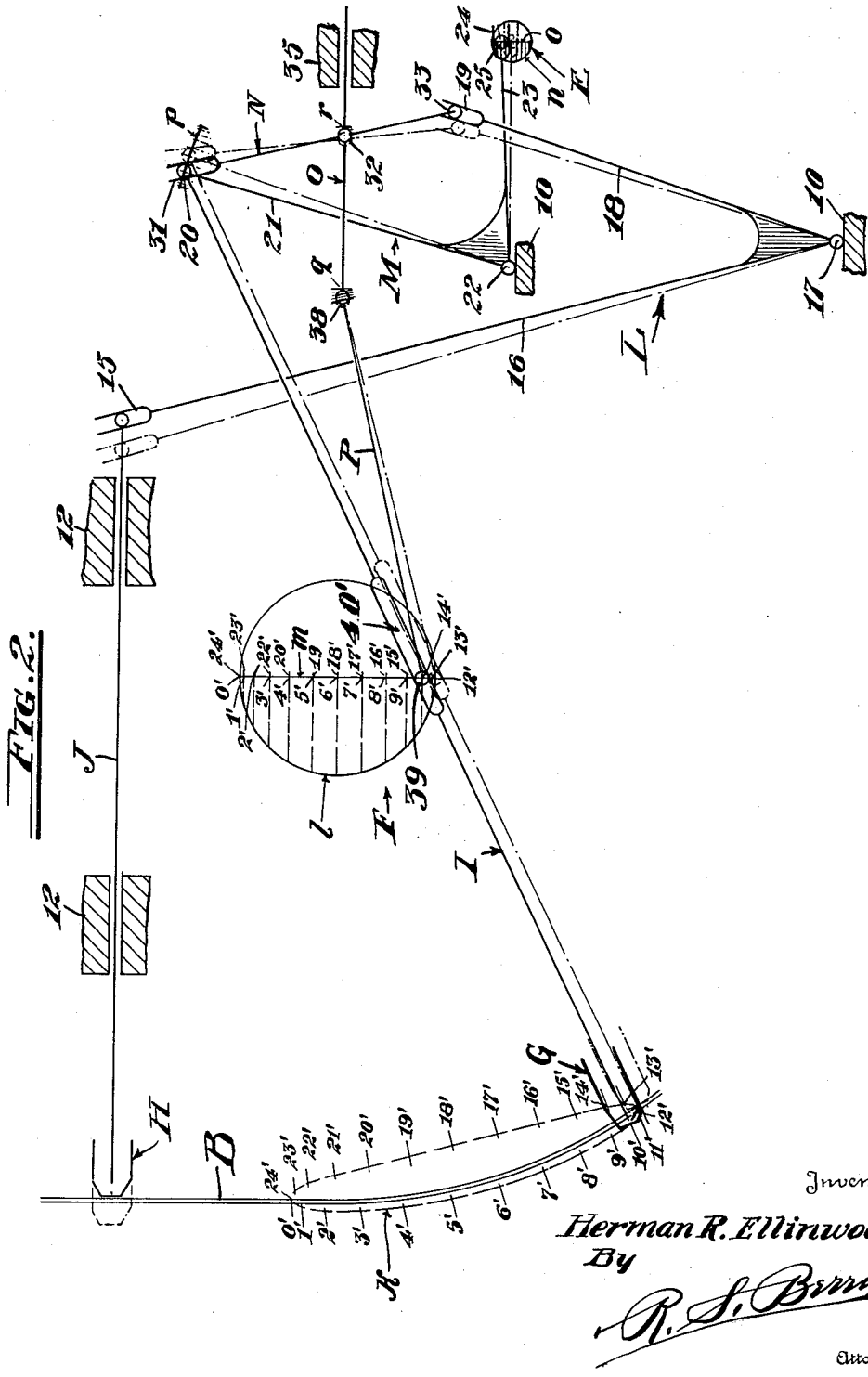
Fig. 2 is a view similar to Fig. 1 showing the parts as disposed with the film engaging claw as positioned in readiness to effect release of the film at the termination of the pull-down stroke and with the register device as about to effect engagement with the film.

The several movements of the parts are graphically illustrated in Figs. 1 and 2, to which reference is now had and in which $k$ indicates the path of travel of the center of the outer end of the film engaging claw G; $l$ designates the path of the travel of the outermost point of the eccentric F; $c$ $m$ the vertical path of travel of the axis of the pin 39; $n$ the path of travel of the outermost point of the eccentric E; $o$ the vertical path of travel of the axis of the pin 25; $p$ the path of travel of the axis of the pivot pin 20 of the claw carrying arm; $q$ the rectilinear path of travel of the pivotal connection of link P with slide bar O; $r$ rectilinear path of travel of the fulcrum of lever N; $s$ the path of travel of the pivotal connection between lever N and arm 18 of lever L; t the path of travel of the pivotal connection between the arm 16 of lever L and slide bars J; and u the rectilinear path of travel of the register pins H.

As a means for facilitating comprehension of various relative positions of the parts during operation, the path of travel k of the claws G is marked with numerically designated points representing positions assumed by the claws throughout a revolution of the eccentrics E and F at intervals of fifteen degrees apart, and for convenience the intervals on the path of travel k are designated consecutively from 0' to 24', and certain points on the other paths of travel l, m, n, o, p, q, r, s, and t are designated with numbers corresponding to those on the path of travel k to indicate corresponding positions of the parts relative to each other during a cycle of operation, as will be more fully understood as explanation of the operation proceeds.

Assume the parts to be positioned as shown in full lines in Fig. 1, that is, with the claws G and the register pins H both engaged with the film B, which coincident engagement occurs only at the instant of entry of the claws G into engagement with the perforations in the film after termination of the upstroke of the claws and immediately before they start to move downwardly on their downstroke; the claws G being previously moved longitudinally to introduce them into the film perforations by advance longitudinal movement of the arm I by the bell crank lever M under the action of the eccentric E. With the parts thus disposed the major axis of the eccentric E extends longitudinally with the follower 26 in its intermediate position as shown in Fig. 7, while the major axis of the eccentric F extends vertically with the follower 41 in its uppermost position as shown in Fig. 6, and with the outermost point of the eccentric F disposed at the coincident points of commencement (0') and termination (24') of the paths of travel k, l and m.

On slight turning movement of the eccentrics E and F in the direction indicated by the arrows in Figs. 7 and 6, respectively, the follower 26 will be moved upwardly while the follower 41 will move downwardly. Upward movement of the follower 26 acts to rock the bell crank lever M to slightly advance the upper end of the long arm 21 thereof and thereby impart a linear movement to the claw carrying arm I, and at the same time downward movement of the follower 41 acts to impart initial downward movement of the arm I as indicated in dotted lines in Fig. 1. This down movement of arm I imparts a slight rearward movement to the link P which effects a slight rearward linear movement of the slide bar O thereby effecting slight rearward shifting of the fulcrum 32 of lever N the upper end of which in the meantime has been advanced with the upper end of the arm 21 of the lever M. The link N is thus rocked on its shifting fulcrum and thereby caused to rock the bell crank lever L through the pin 33 and yoke 19 whereby the upper end of the long arm 16 of the bell crank lever L will effect rapid retraction of the slide bars J to withdraw the register pins H out of engagement with the perforations in the film B, as indicated in dotted lines in Fig. 1.

Continued downward movement of the arm I causes the claws G then engaged with the film perforations, to traverse the path k from the point 0' to 12' which latter point is reached when the eccentric F has moved the follower 41 to its lowermost position on the path m indicated at 12' on the latter in Figs. 1 and 2. During this movement, the arm I in approaching the point 12' will remain in its fully advanced position but at this point the eccentric E will commence moving the follower 26 downward thereby effecting reverse rocking movement of the bell-crank lever M as indicated in dotted lines in Fig. 2 so as to retract the arm I and withdraw the claws G out of engagement with the film.

The initial retrograde movement of the arm I and lever M rocks lever N which in turn rocks bell-crank lever L to quickly advance the slide bars J and thereby effect rapid engagement of the register pins H with the film.

Continued movement of the eccentrics returns the arm I to its uppermost position with the claws G free of the film during which time the register pins are maintained in engagement with the film; a revolution of the eccentrics thus completing a cycle of operation.

The present invention contemplates obviating gear driving of the eccentric carrying shaft, which is accomplished by providing an arrangement of interconnected arms adapted to be actuated by eccentrics mounted on a shaft extending at right angles to the plane of the film, such as the shutter operating shaft; thus doing away with the sound or hum incident to the use of gear connection.

Furthermore, by the provision of the arrangement of the levers L, M and N, slide bar O and link P, as herein set forth a more effective movement of the pull-down claws and register pins is afforded and especially in relation to each other than that obtained by mechanism of this type heretofore devised, in that a more rapid pull-down and relatively longer dwell of the film is accomplished and more accurate timing of the relative moment of engagement and disengagement of the claws and register pin is effected.

By the provision of the slide bar O and the link P a shiftable fulcrum is afforded intermediate the ends of the register pin operating lever N, whereby during swinging of the arm I movement of the register pins will be slight and at the moment of longitudinal movement of the arm I acceleration of the register pins in engaging and disengaging the film will occur.

I claim:

1. In a film movement the combination of a film guide, a claw arm adapted to intermittently move film in said guide, means for actuating said arm, a slide, a link attached to said arm connected to said slide operating to transfer longitudinal components to said slide moving along a plane perpendicular to the plane of said film guide, a pivot pin mounted on said slide, a lever supported on said pin intermediate its ends, means for coupling one end of said lever to said claw arm to transfer components of motion parallel to the axis of the aforementioned slide, film registration pins, means for coupling the opposite end of said lever to said film registration pins in such a manner that while the film engaging claw arm is out of engagement with the film said registration pins are engaged with film perforations.

2. In a film movement the combination of a film guide, a claw arm adapted to intermittently move film in said guide, means for actuating said arm, a slide, a link attached to said arm connected to said slide operating to transfer longitudinal components to said slide moving along a plane perpendicular to the plane of said film guide, a pivot pin mounted on said slide, a lever supported on said pin intermediate its ends, means for coupling one end of said lever to said claw arm to transfer components of motion parallel to the axis of the aforementioned slide, film registration pins, means for coupling the opposite end of said lever to said film registration pins in such manner that while the film engaging claw arm is out of engagement with the film said registration pins are engaged with film perforations and in such manner that said registration pins will remain stationary or nearly stationary while engaged with perforations in the film during the greater part of the period during which said film engaging claw arm is out of engagement with the film.

3. In a film movement the combination of a film guide, a claw arm adapted to intermittently move film in said guide, means for oscillating said arm, a slide, a link attached to said arm connected to said slide operating to transfer longitudinal components to said slide moving along a plane perpendicular to the plane of said film guide, a pivot pin mounted on said slide, a lever supported on said pin intermediate its ends, means for coupling one end of said lever to said claw arm to transfer components of motion parallel to the axis of the aforementioned slide, reciprocal film registration pins, means connecting the opposite end of said lever to said film registration pins in such manner that while the film engaging claw arm is out of engagement with the film said registration pins are engaged with film perforations and in such a manner that said registration pins engage perforations in the film and remain stationary or nearly stationary during the greater part of the period during which said film engaging claw arm is out of engagement with the film.

4. In a film movement the combination of a film guide, a claw arm adapted to intermittently move film in said guide, eccentric operated means for oscillating said arm, eccentric operated means for reciprocating said arm, a slide, a link attached to said arm connected to said slide operating to transfer longitudinal components to said slide moving along a plane perpendicular to the plane of film guide, a pivot pin mounted on said slide, a lever supported on said pin intermediate its ends, means for coupling one end of said lever to said claw arm to transfer components of motion parallel to the axis of the aforementioned slide, film registration pins, means for coupling the opposite end of said lever to said film registration pins in such manner that while the film engaging claw arm is out of engagement with the film said registration pins are engaged with film perforations and in such manner that said registration pins engage perforations in the film and remain stationary or nearly stationary during the greater part of the period during which said film engaging claw arm is out of engagement with said film.

5. In a film movement, a film actuating claw arm, a pivoted bell-crank lever extending on a plane parallel with said claw arm on which said arm is pivoted, a pair of eccentrics mounted to rotate on parallel planes extending at right angles to the planes of said bell-crank lever and claw arm, a shaft upon which said eccentrics are mounted, means actuated by one of said eccentrics for rocking said lever to effect longitudinal movement of said arm including a yoke carried by said lever engaging one of said eccentrics, and means for oscillating said arm by the other of said eccentrics including a second yoke engaging said other eccentric and a pivot pin connecting said second yoke and said arm.

6. In a film movement, a film actuating claw arm, a lever on which said arm is pivoted, eccentric operated means for rocking said lever to effect longitudinal movement of said arm, a vertically reciprocal yoke, a pin carried by said yoke slidably engaging said arm intermediate its ends, and a circular eccentric arranged within said yoke with its periphery engaged therewith for reciprocating said yoke.

7. In a film movement, a film actuating claw arm having longitudinally extending slot intermediate its ends, a reciprocal yoke, a pin on said yoke engaging said slot, a circular eccentric disposed within the yoke for actuating said yoke, a lever with which one end of said arm is pivotally connected arranged to effect longitudinal movement of said arm on rocking of said lever, a reciprocal follower pivotally connected to said lever, and an eccentric for actuating said follower.

8. In a film movement, a film actuating claw arm having a longitudinally extending slot intermedite its ends, a reciprocal yoke, a pin on said yoke engaging said slot, a circular eccentric disposed within the yoke for actuating said yoke, a lever with which one end of said arm is pivotally connected arranged to effect longitudinal movement of said arm on rocking of said lever, a reciprocal follower pivotally connected to said lever, an eccentric for actuating said follower, and means for rotating said yoke and follower actuating eccentrics in unison.

9. In a film movement, a film actuating claw arm having a longitudinally extending slot intermediate its ends, a reciprocal yoke, a pin on said yoke engaging said slot, a circular eccentric disposed within the yoke for actuating said yoke, a lever with which one end of said arm is pivotally connected arranged to effect longitudinal movement of said arm on rocking of said lever, a reciprocal follower pivotally connected to said lever, an eccentric for actuating said follower, and means for rotating said yoke and follower actuating eccentrics in unison; said yoke actuating eccentric having a diameter exceeding that of the follower actuating eccentric.

10. In a film movement mechanism, a film actuating claw arm, a bell-crank lever, a pivotal connection between one arm of said lever and said claw arm on which the latter is adapted to swing vertically, means engaging the other arm of said lever for rocking the lever to effect reciprocation of said claw arm, vertically reciprocal means for oscillating said claw arm, a slide bar, a link connecting said slide bar to said vertically reciprocal means arranged to reciprocate said slide bar rectilinearly on oscillation of said claw arm, a lever pivotally carried on said slide bar having one end thereof connected to the pivotal connection between said claw arm and said bell-crank lever, and register pin operating means connected to the other end of the lever on said slide bar.

11. In a film movement mechanism, a film guideway having a fixed guide member and a moveable guide member, a panel carrying said moveable guide member, a support on which said panel is slidable to advance or retract said moveable guide member relative to said fixed guide member, and film advancing mechanisms carried on said panel and moveable as a unit therewith adapted to engage film in said guideway when said guide members are in their contiguous position, reciprocal film engaging pins carried by said panel, spring means for maintaining said pins advanced on retraction of said panel, and means for retracting said pins out of engagement with film in said guideway on said guide members being disposed in their contiguous positions.

12. In a film movement mechanism, a fixed guide member, a slidable panel, a moveable guide member carried by said panel adapted on advance of said panel to overlie said fixed guide member contiguous thereto to form a film guideway between said members, a cross-head carried by said panel, film engaging pins on said cross-head, means on said cross head engageable by said fixed guide member for retracting said cross-head and to dispose said pins out of their film engaging position, and springs means for advancing said cross-head on retractive movement of said panel.

13. In a film movement mechanism, a fixed guide member, a slidable panel, a moveable guide member caried by said panel adapted on advance of said panel to overlie said fixed guide member contiguous thereto to form a film guideway between said members, a cross-head carried by said panel, film engaging pins on said cross-head, means on said cross-head engageable by said fixed guide member for retracting said cross-head and to dispose said pins out of their film engaging position, springs means for advancing said cross-head on retractive movement of said panel, and film actuating mechanism carried on said panel and moveable therewith as a unit including film engaging and film moving elements adapted to act on film in said guideway when said guide members are in their contiguous position.

HERMAN RAY ELLINWOOD.